Oct. 10, 1961  H. W. BROWN  3,003,790
IMPLEMENT HITCH

Filed Feb. 8, 1960  2 Sheets-Sheet 1

*INVENTOR.*
HAROLD W. BROWN

BY
ATTORNEYS

Oct. 10, 1961  H. W. BROWN  3,003,790
IMPLEMENT HITCH
Filed Feb. 8, 1960  2 Sheets-Sheet 2
FIG. 3
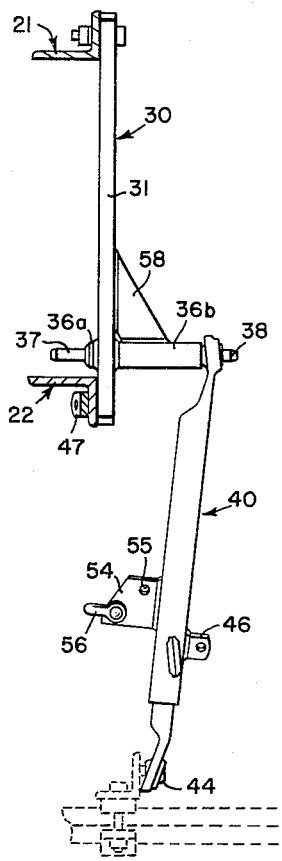
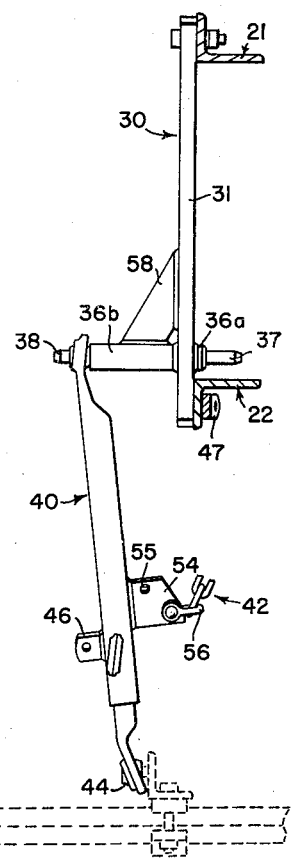
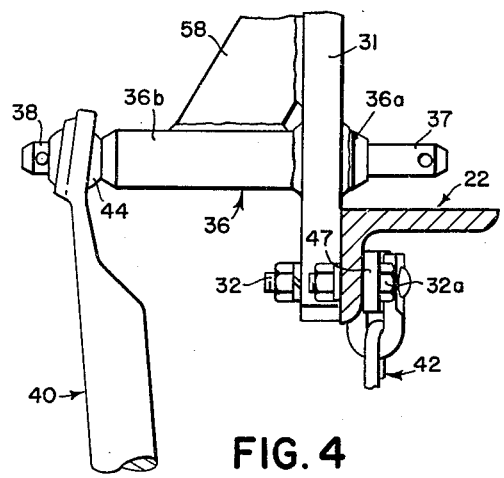
FIG. 4
INVENTOR.
HAROLD W. BROWN
BY
C. T. Parke R C Johnson
ATTORNEYS 3,003,790
IMPLEMENT HITCH
Harold W. Brown, Cedar Falls, Iowa, assignor to Deere & Company, Moline, Ill., a corporation of Delaware
Filed Feb. 8, 1960, Ser. No. 7,316
5 Claims. (Cl. 280—415)

This invention relates generally to agricultural implements and more particularly to hitch devices for connecting ground working implements with a tractor.

The object and general nature of this invention is the provision of a hitch device particularly constructed and arranged to connect implements, normally associated with conventional tractors, with specialty-crop tractors. One of the types of specialty-crop tractors most frequently encountered are those adapted to work in tall, bushy, wide, or high bedded crops and for this use the tractors generally are equipped with drop type axle housings in which the end portions of the tractor rear axle structure includes depending sections carrying the drive mechanism and the drive wheels of the tractor, driven by said mechanism, are journaled in the lower portions of the drop housings, whereby the tractor rear axle structure readily passes over tall or high bedded crops, or tall, wide or bushy plants without damaging them.

While such tractors are particularly adapted for specialty crops, as just mentioned, it is also desirable to be able to use these tractors with more or less conventional implements, and it is the principal feature of this invention to provide a hitch means for attaching more or less conventional implements to one of the so-called high crop tractors, such hitch means permitting the use of standard type hitch mechanism. Further, it is another important feature of this invention to provide hitch means that not only accommodates conventional implements, but also readily accommodates implements particularly adapted for use with specialty crops, such as those mentioned above, the hitch means being so constructed and arranged that there is no loss of clearance that is so desirable and so important in working tall, bushy, wide or high bedded crops.

These and other objects and advantages of the present invention will be apparent to those skilled in the art after a consideration of the following detailed description, taken in conjunction with the accompanying drawings, in which:

FIG. 3 is a plan view similar to FIG. 2, showing the hitch means arranged to connect conventional implements with a high crop tractor.

FIG. 4 is a fragmentary view, taken at an enlarged scale, showing one feature of the construction of the draft link supports that form a portion of the present hitch means of this invention.

Figure 1:
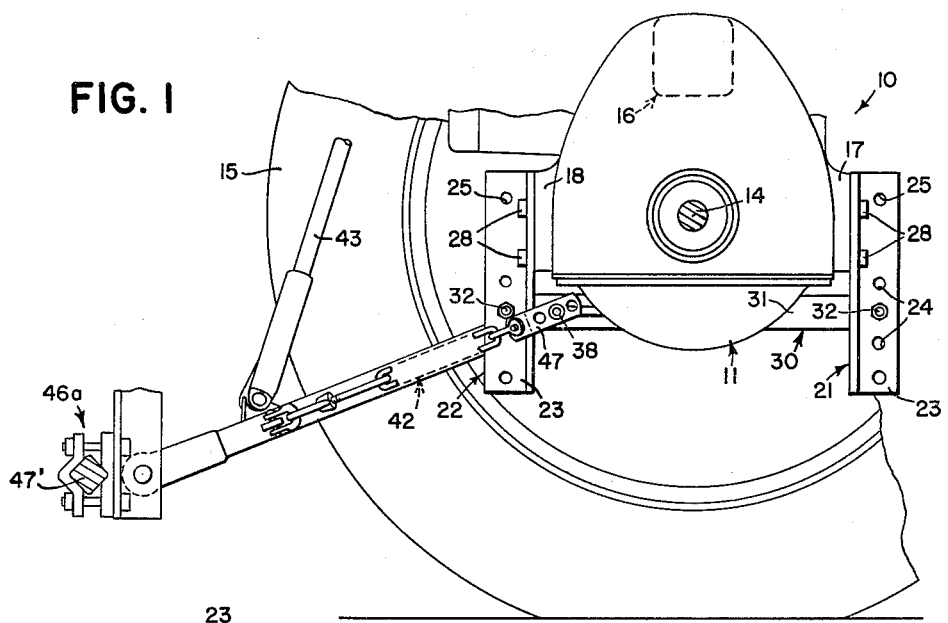
FIG. 1 is a fragmentary side view, with certain parts in section, showing hitch means incorporating the principles of the present invention.
Figure 2:
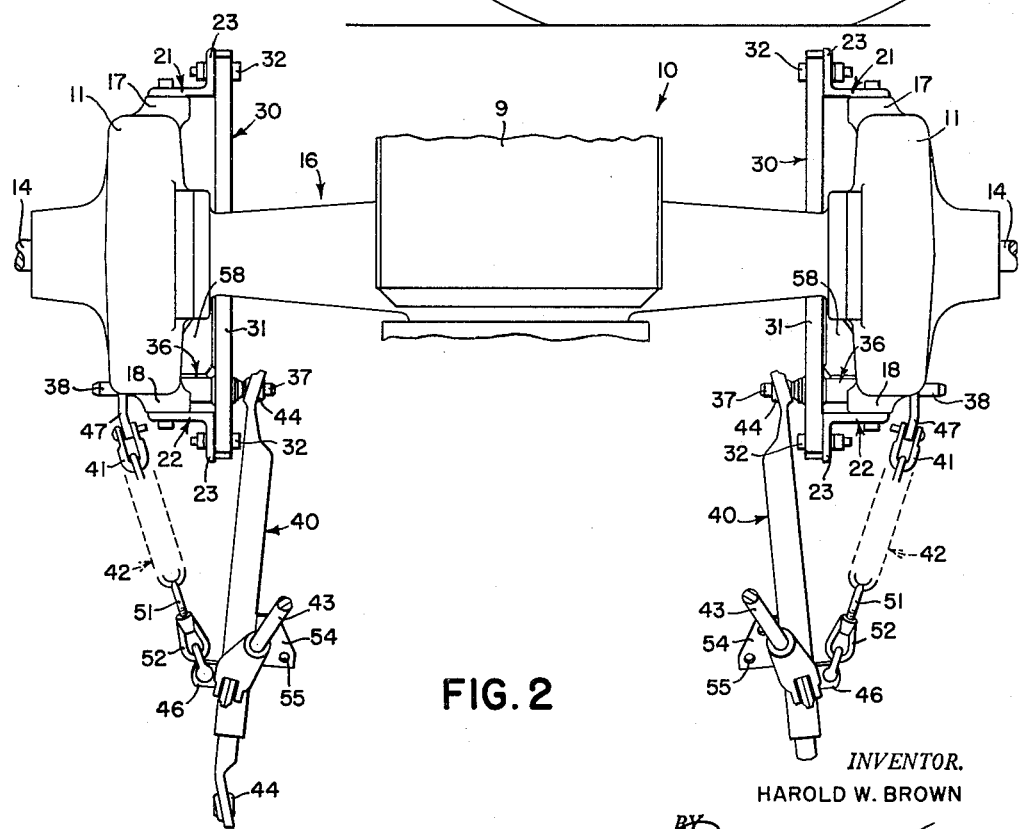
FIG. 2 is a plan view of the structure shown in FIG. 1, showing the hitch mechanism arranged for connecting high crop implements to the tractor, with a maximum of clearance underneath the rear axle of the tractor.

Referring first to FIGS. 1 and 2, the tractor is indicated in its entirety by the reference numeral 10 and includes a central transmission housing or frame 9 that at its rear portion carries downwardly extending drop housings 11, each of which carries a short stub shaft 14 on which a rear drive wheel 15 is fixed. This is conventional construction so far as high crop tractors are concerned and provides an arrangement in which the central portion of the rear axle housing, indicated at 16 in FIG. 2, is disposed well above the ground so that there is ample clearance between the surface of the ground and the rear axle 16 by virtue of the drop axle type of construction. According to this invention, the front and rear portions of each drop housing 11 are provided with front and rear bosses 17 and 18 that form attachment pads. Secured to each front attachment pad 17 is a front support in the form of an angle 21, and fastened to the rear attachment pads 18 are similar angles 22 forming rear supports. Both sets of angles 21 and 22, as best shown in FIG. 1, extend below the associated drop housings 11. Cap screws 28 serve to fix the transverse flanges of the angles 21 and 22 to the associated housings. The other flanges 23 of the angles are disposed in vertical fore-and-aft extending planes, as will be seen from FIG. 2, and are provided with a plurality of apertures 24 and each flange 23 has an upper aperture 25 (FIG. 1).

Forming a part of the hitch mechanism of this invention is a pair of draft link supports each indicated in its entirety by the reference number 30. Each draft link support 30 includes a fore-and-aft extending bar 31 that is apertured at its front and rear ends to receive bolts 32 that fix the associated bar 31 in different positions of vertical adjustment to the associated front and rear support flanges 23. As best shown in FIG. 4, pivot members 36a and 36b are butt welded to each draft link support 31 adjacent its rear portion. Pivot members 36a and 36b, which, taken together, form pivot means 36, are formed with reduced ends 37 and 38, respectively, forming studs that are adapted to receive the front ends of the associated draft links 40. The stud ends 38 are also used to receive the anchor links 47 at the forward portion of the associated sway limit chains 42. The draft links 40 are connected with the tractor raising and lowering means through lift links 43.

As best shown in FIG. 4, each draft link support is so constructed and arranged that each pivot member is fixed, as by welding, in the support bar 31 so that each draft link support includes a relatively short pivot means 36a and a relatively long pivot means 36b. Each draft link 40 is provided with ball type connectors 44 at the front and rear ends thereof. This is conventional construction.

Referring now to FIG. 2, the hitch parts of this invention are arranged for receiving a specialty crop implement, such as a sugar cane cultivator or the like, a portion of which is indicated at 46a in FIG. 1 and shown as including a pair of transverse bar sections 47' with a relatively wide space between their inner ends, such as is shown in the copending application, Ser. No. 708,444 (A–2808), filed by W. S. Tsuchiya, January 13, 1958.

For maximum clearance, according to my invention, the draft link supports 30 are fastened to the drop axle housings 11 so that the longer pivot means 36b extends laterally outwardly from the bars 31 and lie generally underneath the rear portions of the drop axle housings 11. Thus, as shown in FIG. 2, when the draft links 40 are connected to the studs 37 of the relatively short pivot means 36a, there are no laterally inwardly projecting parts of any consequence, and substantially the entire space underneath the rear axle is free and clear for the passage of plants therethrough during operation of the tractor and implement. When arranged in this way, the hitch means of this invention may be locked against lateral swinging by the sway chains 42. As will be clear from FIG. 2, the rear ends of the sway chains 42 are pivotally connected to apertured lugs 46 fixed to the sides of the draft links 40. The forward ends of the sway chains 42 connected through anchor links 47 to the studs 38 on the laterally outer ends of the relatively long pivot means 36b.

The sway chains 42 may be adjusted by any suitable means, such as by providing each sway chain 42 with a threaded eye bolt 51 and an associated interiorly threaded coupling member 52. Adjusting one of these members relative to the other serves to adjust the effective length of the sway chain 42.

Referring now to FIG. 3, this figure shows the draft link support bars turned over or reversed relative to the positions in which they are shown in FIG. 2. This disposes the longer pivot means 36b extending laterally inwardly from the drop housings 11 while the shorter pivot means 36a are disposed at the laterally outer side of the associated draft link support bars 31. The forward ends of the draft links 40 are, as shown in FIG. 3, mounted on the laterally inner ends 38 of the relatively long pivot means 36b, which disposes the draft links in about the positions they occupy when carried by standard or tricycle type tractors. When arranged in this way, the hitch means of this invention is adapted to readily receive, for example, the cross bar 47 or other attachment connection of an implement normally connectible to a standard or tricycle tractors. As shown in FIG. 4, the sway chains 42 are connected between the rear portions of the draft links 40 and the rear ends of the bars 31, the bolts 32 receiving the sway chain anchor links 47 that, as shown in FIG. 3, are rigidly fixed in place by the bolts 32 and an upper bolt 32a.

As best shown in FIG. 4, the rear ends of the sway chains 42 are connected in two optional positions relative to the draft links 40. As will be seen by comparing FIGS. 2 and 3, when the draft links are arranged as shown in FIG. 3, they are turned over with respect to the position shown in FIG. 2, which disposes enlarged sway chain brackets 54 at the outer sides of the draft links 40. Each bracket 54 is provided with two apertures 55, and the coupling link 56 of each sway chain 42 may be connected in one or the other of the openings 55, depending on whether the rear ends of the draft links 40 are to be connected with implement-carried bars of a relatively short length, such as is carried by relatively small implements, or by longer cross bars such as are carried by the larger category of implements. In both positions, the sway chains 42 limit the lateral swinging of the draft links 40 when arranged as shown in FIG. 3. Also, the length of the sway chains 42 may be adjusted when arranged as shown in FIG. 3 in the same way in which they may be adjusted when arranged as shown in FIG. 2. The connection of the longer pivot means 36b with the associated draft link support bar 31 is reinforced by gusset plate 58.

While I have shown and described above the preferred structure in which the principles of the present invention have been incorporated, it is to be understood that our invention is not to limit it to the particular means, shown and described above, but that, in fact, widely different means may be employed in the practice of the broader aspects of my invention.

What I claim, therefore, and desire to secure by Letters Patent is:

1. A hitch device particularly adapted for tractors having drop axles, said hitch device comprising a pair of draft link supports, each including a generally fore-and-aft extending bar apertured adjacent one end and a pivot member disposed in the aperture and extending outwardly from one side of said bar an appreciably greater extent than from the other side, thereby forming a relatively short pivot means at one side of the bar and a relatively long pivot means at the other side of the bar, said pivot member being generally normal to said bar, and means optionally fixing said bars to the lower portions of said drop housings, respectively, in either of two positions, one position being that in which the relatively long pivot means extend laterally outwardly generally underneath the drop housings and the other position being that in which the relative long pivot means extends laterally inwardly from said drop housings, each pivot member carrying draft link receiving means at its ends.

2. A hitch device particularly adapted for tractors having drop axles, said hitch device comprising a pair of draft link supports, each including a generally fore-and-aft extending bar, means forming a pivot member extending outwardly from one side of said bar an appreciably greater extent than from the other side, thereby forming a relatively short pivot means at one side of the bar and a relatively long pivot means at the other side of the bar, said pivot member being generally normal to said bar, and means optionally fixing said bars to the lower portions of said drop housings, respectively, in either of two positions, one position being that in which the relatively long pivot means extend laterally outwardly from the associated fore-and-aft extending members generally underneath the drop housings and the other position being that in which the relatively long pivot means extend laterally inwardly from the associated fore-and-aft extending members, rearwardly extending draft links connected at their forward ends with the relative short pivot means when the latter extend inwardly, and sway limiting means adapted to be connected between said draft links rearwardly of the front ends thereof and the outer ends of the relatively long pivot means.

3. A hitch device particularly adapted for tractors having drop axles, said hitch device comprising a pair of draft link supports, each including a generally fore-and-aft extending bar, means forming a pivot member extending outwardly from one side of said bar an appreciably greater extent than from the other side, thereby forming a relatively short pivot means at one side of the bar and a relatively long pivot means at the other side of the bar, said pivot member being generally normal to said bar, and means optionally fixing said bars to the lower portions of said drop housings, respectively, in either of two positions, one position being that in which the relatively long pivot means extend laterally inwardly from the associated fore-and-aft extending members generally in the space between the drop housings and the other position being that in which the relatively long pivot means extend laterally outwardly from the associated fore-and-aft extending members, rearwardly extending draft links connected at their forward ends with the laterally inner ends of the relatively long pivot means when the latter extend inwardly, and sway limiting means adapted to be connected between said draft links rearwardly of the front ends thereof and the lower ends of the rear portions of said draft link supports.

4. A hitch device particularly adapted for tractors having drop axles to which implement attaching draft links are adapted to be connected, said hitch device comprising a pair of draft link supports, each including a generally fore-and-aft extending bar apertured closely adjacent each end, pivot means fixedly carried by each bar and extending outwardly from one side of said bar an appreciably greater extent than from the other side, thereby forming a relatively short pivot means at one side of the bar and a relatively long pivot means at the other side of the bar, said pivot means being generally normal to said bar, each of said long and short pivot means having its outer end reduced in diameter to form a draft link receiving stud, front and rear supports adapted to be fixed to the front and rear portions, respectively, of the tractor drop housings and to extend below the latter, and means extending through the end openings of said foreand-aft extending bars for connecting the latter to the lower ends of said front and rear supports in either of two positions, one position being that in which the relatively long pivot means extending laterally outwardly generally underneath the drop housings and the other position being that in which the relative long pivot means extends laterally inwardly from said drop housings, means connecting the forward ends of the draft links optionally to one or the other of the pair of relatively long and relatively short pivot means when extending inwardly.

5. The invention set forth in claim 4, further characterized by sway limiting means adapted to be connected between said draft links rearwardly of the front ends thereof and the relatively long pivot means when said draft links are connected to the short pivot means.

References Cited in the file of this patent
UNITED STATES PATENTS

| | | |
|---|---|---|
| 2,456,359 | Andrews | Dec. 14, 1948 |
| 2,539,666 | Jirsa et al. | Jan. 30, 1951 |
| 2,673,506 | Miller et al. | Mar. 30, 1954 |